(12) United States Patent
Achten et al.

(10) Patent No.: US 12,428,583 B2
(45) Date of Patent: Sep. 30, 2025

(54) USE OF DISPERSION ADHESIVES FOR FOAM BONDING

(71) Applicant: Covestro Deutschland AG, Leverkusen (DE)

(72) Inventors: Dirk Achten, Leverkusen (DE); Wolfgang Arndt, Dormagen (DE); Robert Liberati, Hürth-Efferen (DE); Christoph Thiebes, Cologne (DE); Peter Kueker, Leverkusen (DE); Harald Kraus, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 650 days.

(21) Appl. No.: 17/778,884

(22) PCT Filed: Dec. 3, 2020

(86) PCT No.: PCT/EP2020/084369
§ 371 (c)(1),
(2) Date: May 23, 2022

(87) PCT Pub. No.: WO2021/115899
PCT Pub. Date: Jun. 17, 2021

(65) Prior Publication Data
US 2022/0411683 A1    Dec. 29, 2022

(30) Foreign Application Priority Data
Dec. 10, 2019  (EP) .................................... 19214906

(51) Int. Cl.
*C09J 175/06* (2006.01)
*C08G 18/08* (2006.01)
(Continued)

(52) U.S. Cl.
CPC ........ *C09J 175/06* (2013.01); *C08G 18/0804* (2013.01); *C08G 18/3206* (2013.01); *C08G 18/4238* (2013.01)

(58) Field of Classification Search
None
See application file for complete search history.

(56) References Cited

U.S. PATENT DOCUMENTS 4,055,695 A * 10/1977 Last ........................... C08J 9/36
                                                                        521/134
9,453,147 B2    9/2016 Kraus et al.
(Continued)

FOREIGN PATENT DOCUMENTS

WO    WO-2009059696 A1 * 5/2009 ......... C08G 18/0828

OTHER PUBLICATIONS

International Search Report, PCT/EP2020/084369, date of mailing: Feb. 26, 2021, Authorized officer: Martin Bergmeier.

*Primary Examiner* — Robert S Jones, Jr.
*Assistant Examiner* — Lily K Sloan
(74) *Attorney, Agent, or Firm* — Richard P. Bender; Jed C. Benson

(57) ABSTRACT

The invention relates to the use of an aqueous dispersion containing at least one polyurethane-polyurea polymer formed from (a) at least one difunctional polyester polyol having a number-average molecular weight of 400 to 5000 g/mol, (b) at least one difunctional polyol component having a number-average molecular weight of 762 to 399 g/mol, c) at least one diisocyanate and (d) at least one chain extender optionally having at least one ionic group, for the bonding of at least two substrates by application of the aqueous dispersion to at least one of the substrates to be bonded, subsequent drying of the dispersion present on the at least one substrate in order to obtain at least one adhesive layer, and contacting of the at least one adhesive layer with a (Continued)

further substrate or with an adhesive layer present on a further substrate at a pressure of from 0.1 to 5 bar(a) and a temperature of less than 40° C., wherein the polyurethane-polyurea polymer after the drying has a glass transition temperature Tg of from −65 to 10° C. and a melting point of from 40 to 80° C., to a corresponding process for joining at least two substrates, and to an adhesive composite obtained in this way and comprising at least two substrates and an adhesive layer present between every two substrates.

20 Claims, 1 Drawing Sheet

(51) Int. Cl.
*C08G 18/32* (2006.01)
*C08G 18/42* (2006.01)

(56) References Cited

U.S. PATENT DOCUMENTS

| | | |
|---|---|---|
| 10,384,219 B2 | 8/2019 | De et al. |
| 2002/0002232 A1 | 1/2002 | Sagiv et al. |
| 2008/0262131 A1* | 10/2008 | Linnenbrink ...... C08G 18/0823 524/110 |
| 2009/0240005 A1 | 9/2009 | Kraus et al. |
| 2012/0252926 A1* | 10/2012 | Meyer ................ C08G 18/725 156/275.7 |
| 2014/0249267 A1 | 9/2014 | Kraus et al. |
| 2015/0037555 A1* | 2/2015 | Mai ..................... C08G 18/706 428/339 |
| 2018/0105722 A1 | 4/2018 | Tillack et al. |

\* cited by examiner

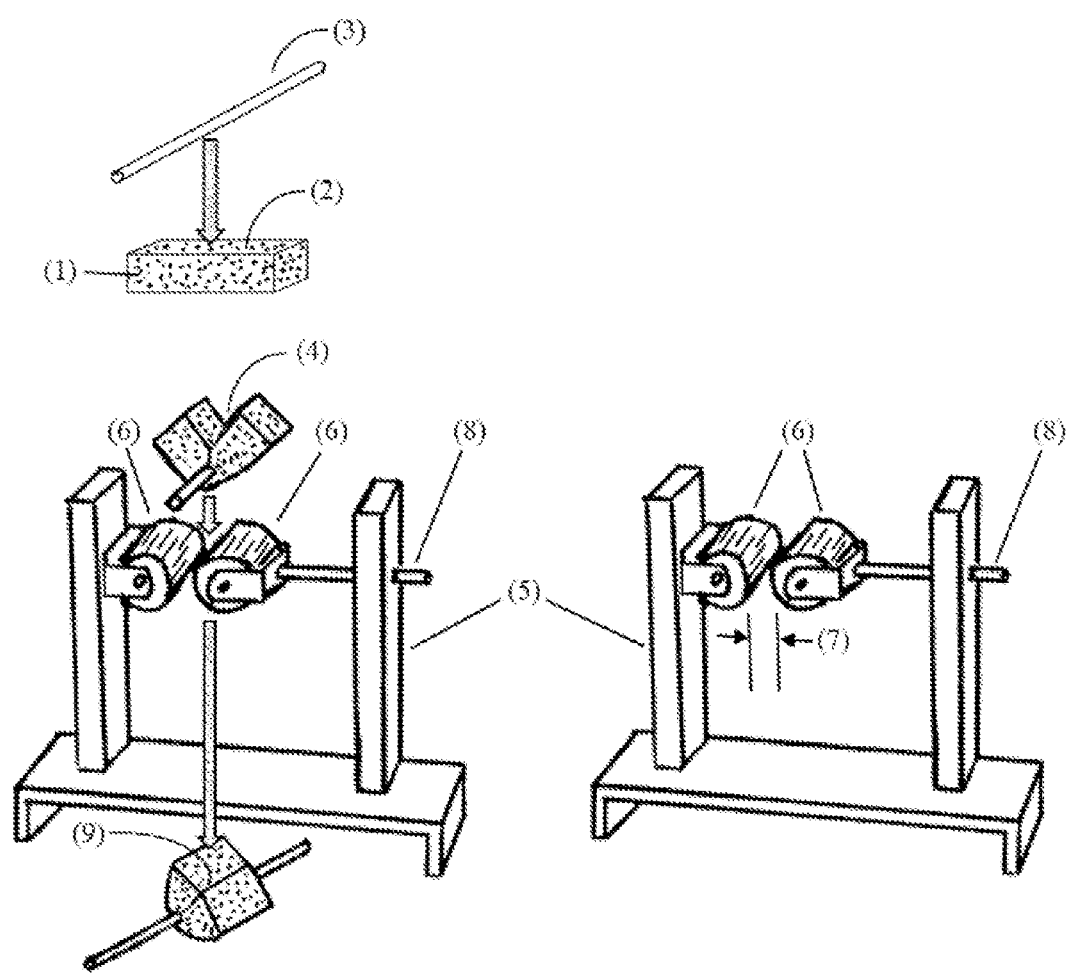

USE OF DISPERSION ADHESIVES FOR FOAM BONDING

CROSS-REFERENCE TO RELATED APPLICATION

This application is a national stage application under 35 U.S.C. § 371 of PCT/EP2020/084369, filed Dec. 3, 2020, which claims the benefit of European Application No. 19214906.0, filed Dec. 10, 2019, each of which is incorporated herein by reference.

FIELD

The invention relates to the use of an aqueous dispersion comprising at least one polyurethane-polyurea polymer formed from (a) at least one difunctional polyester polyol having a number-average molecular weight of 400 to 5000 g/mol, (b) at least one difunctional polyol component having a number-average molecular weight of 62 to 399 g/mol, (c) at least one diisocyanate, and (d) at least one chain extender optionally containing at least one ionic group, for the bonding of at least two substrates by applying the aqueous dispersion to at least one of the substrates to be bonded, then drying the dispersion present on the at least one substrate and bringing the at least one adhesive layer into contact with a further substrate or with an adhesive layer present on a further substrate at a pressure of 0.1 to 10 bar(a) and a temperature of less than 40° C., wherein the polyurethane-polyurea polymer after drying has a glass transition temperature Tg of −65 to 10° C. and a melting temperature of 40 to 80° C., and to a corresponding method for bonding at least two substrates, and also to an adhesive composite thereby obtained, comprising at least two substrates and an adhesive layer present between in each case two substrates.

BACKGROUND

When bonding foam substrates to other substrates, for example in foam-foam, foam-wood, and foam-plastic combinations, use is predominantly made of polychloroprene dispersion adhesives according to the spray-coagulation method. In this method, the adhesive and a coagulant are separately supplied to a spray gun, mixed in the spray jet, and coagulated. Since mixing does not take place until in the spray jet, no pot life needs to be taken into account. Moreover, the coagulated adhesive remains on the substrate surface to be bonded and undergoes little or no diffusion into the pore structure of the foam substrates. High initial strengths, sufficiently long open times, and good heat resistances are frequently achieved.

Important fields of use of this technology are the production of mattresses and seated furniture. There is a demand from Scandinavian countries in particular for chlorine-free alternatives to polychloroprene dispersion adhesives, in order for example to be able to meet the requirements of the Nordic Ecolabel. They should also have the features of high initial strengths and a sufficiently long open time.

Adhesives based on aqueous polyurethane dispersions have become established worldwide in demanding industrial uses, for example in shoe manufacture, in the bonding of parts for motor vehicle interiors, in sheet lamination or in the bonding of textile substrates.

When using polyurethane dispersions for bonding substrates, the heat-activation method is commonly employed for this purpose. In this method, the dispersion is applied to the substrate and, once the water has completely evaporated, the adhesive layer is activated by heating, for example using an infrared radiator, and is converted into an adhesive state. The temperature at which the adhesive film becomes tacky is referred to as the activation temperature. Bonding takes place here at temperatures above the melting temperature and under pressure, which is why it is desirable for successful bonding that the substrates have high temperature resistance at the requisite high pressure. The resulting bond seam is further characterized by high strength but also stiffness, which is why the use of polyurethane dispersions for bonding flexible foam substrates that can undergo irreversible deformation at higher activation temperatures has not yet been described. Furthermore, the customary method often results in a stiff, continuous bond seam that in some cases significantly reduces the comfort of the flexible foam.

However, when using polyurethane dispersions or polyurethane-polyurea dispersions, it is also possible to employ the wet-bonding method, that is to say bonding is carried out immediately after application of the adhesive. The parts to be joined need to be mechanically fixed in place until the adhesive has set. This method is often used for the bonding of wood or textile substrates.

Neither the classical heat-activation method nor the wet-bonding method are very suitable for the bonding of foam substrates. The slow evaporation of the water in particular necessitates long wait times between application of the adhesive and the bonding process, or appropriate drying systems. Moreover, a not insignificant portion of the adhesive may undergo diffusion into the pores of the foam substrates before or during drying and is then no longer available for the actual bonding.

The adhesives based on aqueous polyurethane dispersions that are established on the market are generally not suitable for use in the spray-application method, since they either do not coagulate sufficiently rapidly, do not have sufficient initial strengths, or, as a result of the crystallinity of the polymers, form very hard bond seams that are unacceptable, especially for mattress production. The open time, that is to say the time interval between application of the adhesive until joining together the parts to be joined, during which a sufficiently good bond is still obtained, is also generally just one minute. However, in many bonding processes at least twice as much time is required.

WO 2013/053786 A1 describes aqueous polyurethane dispersions in which the polymer present therein has a melting temperature from 30° C. to 50° C., determined by dynamic differential thermal analysis in accordance with DIN 65467 at a heating rate of 20 K/min, the polymer having two differently crystallizing polyester polyols in defined proportions. These polyurethane dispersions are suitable primarily as cold-contact adhesives, but can also be employed by means of spray-coagulation methods. However, the initial strengths thereby achievable are insufficient for most uses in foam bonding.

Luphen® D DS 3548 from BASF SE provides an epoxy resin-modified polyurethane dispersion that inter alia is reportedly also suitable for the spray-coagulation method. The basis of the epoxy resin used here is bisphenol A diglycidyl ether. Since bisphenol A and derived products are viewed in an extremely critical light with regard to a possible endocrine effect, especially by end consumers, and are consequently generally rejected, there is a desire for adhesives and other products that are free from bisphenol A.

EP 2 090 603 A2 discloses aqueous dispersions comprising a mixture of

A) an aqueous polyurethane dispersion or polyurethane-urea dispersion comprising I, a polymer A) formed from I(i) at least one difunctional aliphatic polyester polyol having a molecular weight of 400 to 5000 g/mol, I(ii) at least a mixture of hexamethylene diisocyanate (HDI) and 1-isocyanato-3,3,5-trimethyl-5-isocyanatomethylcyclohexane (IPDI), and I(iii) at least a mixture of two or more amine chain extenders, wherein at least one compound bears an ionic group, and the polymer A) is after drying partially crystalline or crystalline with a glass transition at a glass transition temperature Tg of −65 to −40° C., B) an aqueous polyurethane dispersion or polyurethane-urea dispersion different from A) comprising II, a polymer B) formed from II(i) at least one difunctional aromatic polyester polyol having a molecular weight of 400 to 5000 g/mol, II(ii) at least one difunctional polyol component having a molecular weight of 62 to 399 g/mol, II(iii) at least one aliphatic diisocyanate, and II(iv) at least one amine chain extender having an ionic group, wherein polymer B) is after drying amorphous with a glass transition at a glass transition temperature Tg of −15 to +10° C.

These compositions of aqueous polyurethane dispersions or polyurethane-polyurea dispersions are suitable as adhesives both according to the heat-activation method and according to the wet-bonding method and exhibit adhesive strengths better than those of their individual components.

SUMMARY

The object of the present invention was thus to provide a chlorine- and bisphenol A-free alternative to polychloroprene dispersion adhesives for the bonding of foam substrates by the spray-application method that does not have the disadvantages of the prior art and that in particular has the features of high initial strengths and a sufficiently long open time, preferably of at least 2 minutes. These objects are achieved according to the invention by the use of an aqueous dispersion comprising at least one polyurethane-polyurea polymer formed from
 (a) at least one difunctional polyester polyol having a number-average molecular weight of 400 to 5000 g/mol,
 (b) at least one difunctional polyol component having a number-average molecular weight of 62 to 399 g/mol,
 (c) at least one diisocyanate, and
 (d) at least one chain extender, optionally containing at least one ionic group
for the bonding of at least two substrates by applying the aqueous dispersion to at least one of the substrates to be bonded, then drying the dispersion present on the at least one substrate so as at least one adhesive layer and bringing the at least one adhesive layer into contact with a further substrate or with an adhesive layer present on a further substrate at a pressure of 0.1 to 10 bar(a) and a temperature of less than 40° C.,
 wherein the polyurethane-polyurea polymer after drying has a glass transition temperature Tg of −65 to 10° C. and a melting temperature of 40 to 80° C.

The objects are also achieved according to the invention by the method for connecting at least two substrates, comprising at least the steps of
 (A) providing an aqueous dispersion comprising at least one polyurethane-polyurea polymer that after drying has a glass transition temperature Tg of −65 to 10° C. and a melting temperature of 40 to 80° C., formed from
  (a) at least one difunctional polyester polyol having a number-average molecular weight of 400 to 5000 g/mol,
  (b) at least one difunctional polyol component having a number-average molecular weight of 62 to 399 g/mol,
  (c) at least one diisocyanate, and
  (d) at least one chain extender, optionally containing at least one ionic group,
 (B) applying the aqueous dispersion from step (A) to at least one of the substrates,
 (C) drying the at least one dispersion present from step (B) so as to obtain at least one adhesive layer, and
 (D) bringing the at least one adhesive layer into contact with a further substrate or with an adhesive layer present on a further substrate at a pressure of 0.1 to 10 bar(a) and a temperature of less than 40° C.

The use according to the invention and the method according to the invention are described in detail hereinbelow.

BRIEF DESCRIPTION OF THE DRAWINGS

Various features and characteristics of the inventions described in this specification may be better understood by reference to the accompanying figures, in which:
FIG. 1 is a representation of a test specimen that was folded in the middle with a wooden rod immediately after drying in the drying oven at 60° C. and immediately passed through 2 steel rollers spaced 10 mm apart.

DETAILED DESCRIPTION

The polyurethane-polyurea polymer used according to the invention is generally formed from
 (a) at least one difunctional polyester polyol having a number-average molecular weight of 400 to 5000 g/mol,
 (b) at least one difunctional polyol component having a number-average molecular weight of 62 to 399 g/mol,
 (c) at least one diisocyanate, and
 (d) at least one chain extender, optionally containing at least one ionic group.

Component (a):

The polyurethane-polyurea polymer employed according to the invention comprises as component (a) at least one difunctional polyester polyol having a number-average molecular weight of 400 to 5000 g/mol.

In a preferred embodiment, the polyurethane-polyurea polymer employed according to the invention comprises as component (a) a difunctional polyester polyol having a number-average molecular weight of 400 to 5000 g/mol. This means that, rather than a mixture of different polyester polyols, just one type of polyester polyol is used as component (a). "One type of polyester polyol" in the context of the present invention means that this preferably employed polyester polyol is uniform in respect of the monomers present, the proportions of the monomers, etc. Those skilled in the art know that, although the molecular weights of the individual polyester polyol molecules present may vary within the specified range, it is nevertheless possible to speak of a polyester polyol.

The number-average molecular weight of the difunctional polyester polyol (a) is preferably 1500 to 3000 g/mol, particularly preferably 1800 to 2500 g/mol, very particularly preferably 1900 to 2300 g/mol. A person of average skill in the art knows that the number-average molecular weight of polymer diols can be calculated for example from the OH value (hydroxyl value). For monomeric polyols, the molecular weight corresponds to the absolute molecular mass in daltons. The OH value is determined in tetrahydrofuran in accordance with DIN EN ISO 4629-2.

Aliphatic and/or aromatic difunctional polyester polyols may according to the invention be used.

According to the invention, difunctional, aliphatic polyester polyols (a) considered suitable include in particular linear polyester diols preparable in a known manner from aliphatic or cycloaliphatic dicarboxylic acids, such as succinic acid, methylsuccinic acid, glutaric acid, adipic acid, pimelic acid, suberic acid, azelaic acid, sebacic acid, nonanedicarboxylic acid, decanedicarboxylic acid, tetrahydrophthalic acid, hexahydrophthalic acid, cyclohexanedicarboxylic acid, maleic acid, fumaric acid, malonic acid or mixtures thereof with polyhydric alcohols such as ethanediol, di-, tri- or tetraethylene glycol, propane-1,2-diol, di-, tri- or tetrapropylene glycol, propane-1,3-diol, butane-1,4-diol, butane-1,3-diol, butane-2,3-diol, pentane-1,5-diol, hexane-1,6-diol, 2,2-dimethylpropane-1,3-diol, 1,4-dihydroxycyclohexane, 1,4-dimethylolcyclohexane, octane-1,8-diol, decane-1,10-diol, dodecane-1,12-diol or mixtures thereof. In place of the free polycarboxylic acid, it is also possible to use for the production of the polyesters the corresponding polycarboxylic anhydrides or corresponding polycarboxylic esters of lower alcohols or mixtures thereof.

Preference as component (a) is according to the invention given to difunctional aliphatic polyester polyols based on succinic acid, methylsuccinic acid, glutaric acid, adipic acid or maleic acid and propane-1,3-diol, butane-1,4-diol or hexane-1,6-diol.

Particular preference as component (a) is given to difunctional aliphatic polyester polyols based on adipic acid and butane-1,4-diol or hexane-1,6-diol.

Very particular preference as component (a) is given to difunctional aliphatic polyester polyols based on adipic acid and butane-1,4-diol.

In a particular embodiment, polyester polyols based on ε-caprolactone or derivatives thereof and copolymers containing ε-caprolactone or derivatives thereof may be used as component (a).

The number-average molecular weight of the difunctional aliphatic polyester polyol (a) is generally 400 to 5000 g/mol, preferably 1500 to 3000 g/mol, particularly preferably 1900 to 2500 g/mol, very particularly preferably 2100 to 2300 g/mol.

A person of average skill in the art knows that the number-average molecular weight of polymer diols can be calculated for example from the OH value (hydroxyl value). For monomeric polyols, the molecular weight corresponds to the absolute molecular mass in daltons. The OH value is determined in tetrahydrofuran in accordance with DIN EN ISO 4629-2.

Suitable difunctional aromatic polyester polyols (a) include in particular linear polyester diols preparable in a known manner from aromatic dicarboxylic acids, for example terephthalic acid, isophthalic acid or o-phthalic acid and also the acid anhydrides thereof, for example o-phthalic anhydride, with polyhydric alcohols, for example ethanediol, di-, tri- or tetraethylene glycol, propane-1,2-diol, di-, tri- or tetrapropylene glycol, propane-1,3-diol, butane-1,4-diol, butane-1,3-diol, butane-2,3-diol, pentane-1,5-diol, hexane-1,6-diol, 2,2-dimethylpropane-1,3-diol, 1,4-dihydroxycyclohexane, 1,4-dimethylolcyclohexane, octane-1,8-diol, decane-1,10-diol, dodecane-1,12-diol or mixtures thereof.

Preference is given to difunctional aromatic polyester polyols (a) based on o-phthalic acid, o-phthalic anhydride and butane-1,4-diol or hexane-1,6-diol.

Particular preference is given to difunctional aromatic polyester polyols (a) based on o-phthalic acid or o-phthalic anhydride and hexane-1,6-diol.

The number-average molecular weight of the difunctional aromatic polyester polyol (a) is 400 to 5000 g/mol, preferably 1500 to 3000 g/mol, particularly preferably 1800 to 2300 g/mol, very particularly preferably 1900 to 2100 g/mol.

A person of average skill in the art knows that the number-average molecular weight of polymer diols can be calculated for example from the OH value (hydroxyl value). For monomeric polyols, the molecular weight corresponds to the absolute molecular mass in daltons. The OH value is determined in tetrahydrofuran in accordance with DIN EN ISO 4629-2.

Component (b):

The polyurethane-polyurea polymer employed according to the invention comprises as component (b) at least one difunctional polyol component having a number-average molecular weight of 62 to 399 g/mol.

Difunctional polyol components having a molecular weight of 62 to 399 g/mol that are suitable as component (b) include for example polyhydric alcohols such as ethanediol, di-, tri- or tetraethylene glycol, propane-1,2-diol, di-, tri-, or tetrapropylene glycol, propane-1,3-diol, butane-1,4-diol, butane-1,3-diol, butane-2,3-diol, pentane-1,5-diol, hexane-1,6-diol, 2,2-dimethylpropane-1,3-diol, 1,4-dihydroxycyclohexane, 1,4-dimethylolcyclohexane, octane-1,8-diol, decane-1,10-diol, dodecane-1,12-diol or mixtures thereof. Also suitable as component (b) according to the invention are low-molecular-weight polyester diols, such as bis(hydroxyethyl) adipate, and/or short-chain difunctional polyether polyols, such as homopolymers, copolymers, and graft polymers of ethylene oxide or propylene oxide.

Particular preference as component (b) is given to butane-1,4-diol and/or hexane-1,6-diol and especial preference to 1,6-hexanediol.

Component (c):

The polyurethane-polyurea polymer employed according to the invention comprises at least one diisocyanate as component (c).

In general, all diisocyanates known to be suitable by those skilled in the art may be employed as the at least one diisocyanate (c). Component (c) is preferably selected from the group consisting of aliphatic, cycloaliphatic, araliphatic, and aromatic diisocyanates.

Employable as component (c) according to the invention are aliphatic compounds having at least two free isocyanate groups per molecule. Preference is given to employing diisocyanates of general formula $Y(NCO)_2$, where Y is a divalent aliphatic hydrocarbon radical having 4 to 12 carbon atoms or a divalent cycloaliphatic hydrocarbon radical having 6 to 15 carbon atoms or a divalent araliphatic radical having 8 to 22 carbon atoms or a divalent aromatic having 6 to 20 carbon atoms.

Examples of such diisocyanates to be used with preference are tetramethylene diisocyanate, methylpentamethylene diisocyanate, hexamethylene diisocyanate, dodecamethylene diisocyanate, 1,4-diisocyanatocyclohexane, 1-isocyanato-3,3,5-trimethyl-5-isocyanatomethylcyclohexane, 4,4'-diisocyanatodicyclohexylmethane or 4,4'-diisocyanato-2,2-dicyclohexylpropane, 4,4'-diisocyanatodicyclohexylmethane (H12MDI), tolylene 2,4-diisocyanate and/or tolylene 2,6-diisocyanate (TDI), diphenylmethane 2,2'-diisocyanate, diphenylmethane 2,4'-diisocyanate and/or diphenylmethane 4,4'-diisocyanate (MDI) or mixtures thereof.

Particular preference is given to hexamethylene diisocyanate (HDI), 1-isocyanato-3,3,5-trimethyl-5-isocyanatomethylcyclohexane (IPDI), and 4,4'-diisocyanatodicyclohexylmethane and mixtures thereof. The isocyanates are however preferably used alone. Very particular preference is given to hexamethylene diisocyanate (HDI).

Preference is according to the invention given to employing a diisocyanate (c) selected from the group consisting of pentamethylene diisocyanate, hexamethylene diisocyanate (HDI), 1-isocyanato-3,3,5-trimethyl-5-isocyanatomethylcyclohexane (IPDI), 4,4'-diisocyanatodicyclohexylmethane (H12MDI), tolylene 2,4-diisocyanate and/or tolylene 2,6-diisocyanate (TDI), diphenylmethane 2,2'-diisocyanate, diphenylmethane 2,4'-diisocyanate and/or diphenylmethane 4,4'-diisocyanate (MDI) and mixtures thereof.

Further preference is according to the invention given to employing as component (c) a mixture of hexamethylene diisocyanate (HDI) and 1-isocyanato-3,3,5-trimethyl-5-isocyanatomethylcyclohexane (IPDI). The HDI:IPDI molar ratio is further preferably 9:1 to 1:9, particularly preferably 3:1 to 1:3, very particularly preferably it is 2:1.

In a further particularly preferred embodiment, it is also possible to employ as component (c) polyisocyanates based on H12MDI or based on mixtures of H12MDI and HDI and/or IPDI.

In a further particularly preferred embodiment, it is also possible to employ as component (c) aromatic isocyanates such as TDI, MDI or mixtures of aromatic isocyanates such as TDI, MDI with aliphatic isocyanates, in particular those mentioned above.

Component (d):

The polyurethane-polyurea polymer employed according to the invention comprises as component (d) at least one, preferably amine, chain extender, optionally containing at least one ionic group.

In general, all chain extenders known to be suitable by those skilled in the art, optionally containing at least one ionic group, may be employed as component (d).

Preference is according to the invention given to employing as component (d) amine chain extenders having at least one ionic group, in particular (d) diamino compounds additionally bearing sulfonate and/or carboxylate groups, particularly preferably selected from the group consisting of sodium or potassium salts of N-(2-aminoethyl)-2-aminoethanesulfonic acid, of N-(3-aminopropyl)-2-aminoethanesulfonic acid, of N-(3-aminopropyl)-3-aminopropanesulfonic acid, of N-(2-aminoethyl)-3-aminopropanesulfonic acid, of the analogous carboxylic acids, and mixtures thereof.

Very particular preference as component (d) is given to the sodium salts of N-(2-aminoethyl)-2-aminoethanesulfonic acid or of the analogous carboxylic acid, with very particular preference given to the sodium salt of N-(2-aminoethyl)-2-aminoethanesulfonic acid.

The amine chain extenders having at least one ionic group (d) may according to the invention be used alone or together with other chain extenders. They are preferably used alone.

Other amine chain extenders in the context of the present invention are for example monoamines, amino alcohols or diamines.

Monoamines suitable according to the invention are aliphatic and/or alicyclic primary and/or secondary monoamines such as ethylamine, diethylamine, the isomeric propylamines and butylamines, higher linear aliphatic monoamines, and cycloaliphatic monoamines such as cyclohexylamine.

Examples of amino alcohols suitable according to the invention, i.e. compounds that contain amino groups and hydroxyl groups in the same molecule, are ethanolamine, N-methylethanolamine, diethanolamine, 1,3-diamino-2-propanol, N-(2-hydroxyethyl)ethylenediamine, N,N-bis(2-hydroxyethyl)ethylenediamine or 2-propanolamine. Further examples of other amine chain extenders are monoamino compounds additionally bearing sulfonic acid and/or carboxyl groups, for example taurine, glycine or alanine.

Examples of diamines suitable according to the invention are ethane-1,2-diamine, hexamethylene-1,6-diamine, 1-amino-3,3,5-trimethyl-5-aminomethylcyclohexane (isophoronediamine), piperazine, 1,4-diaminocyclohexane or bis(4-aminocyclohexyl)methane. Also suitable are adipic dihydrazide, hydrazine and hydrazine hydrate. Polyamines such as diethylenetriamine may also be used as a structural component in place of a diamino compound.

In one embodiment according to the invention, a mixture of two or more amine chain extenders in which at least one amine chain extender bears at least one ionic group is preferably employed as component (d). For the purposes of the present invention, chain extenders also mean monoamines that lead to chain termination.

Particularly preferred constituents of a mixture employed as component (d) are diethanolamine, ethane-1,2-diamine, 1-amino-3,3,5-trimethyl-5-aminomethylcyclohexane (isophoronediamine), piperazine, N-(2-hydroxyethyl)ethylenediamine, and the sodium salts of N-(2-aminoethyl)-2-aminoethanesulfonic acid/-carboxylic acid.

Particular preference is according to the invention given to employing as component (d) a mixture of diethanolamine and the sodium salt of N-(2-aminoethyl)-2-aminoethanesulfonic acid.

The polyurethane-polyurea polymer employed according to the invention is after drying partially crystalline, i.e. it has at least one glass transition temperature Tg of −65 to 10° C., preferably −60 to −20° C., particularly preferably −55 to −30° C., and at least one melting point in the range 40 to 80° C.

A polyurethane-polyurea polymer is in the context of the present invention referred to as partially crystalline particularly when it exhibits, in the DSC measurement in accordance with DIN 65467 at a heating rate of 20 K/min, a melting peak that corresponds to an enthalpy of fusion ≥5 J/g, preferably ≥10 J/g, particularly preferably ≥20 J/g, and very particularly preferably ≥40 J/g. The melting peak is caused by the melting of regular substructures in the polymer.

The melting temperature of the polyurethane-polyurea polymer employed according to the invention is 40 to 80° C., preferably 40 to 70° C., particularly preferably 42 to 55° C. In each case the first heating is evaluated in order also to detect polymers that crystallize slowly.

A polyurethane-polyurea polymer is referred to as amorphous when, during the first heating, it has no melting peak or only a melting peak with an enthalpy of fusion ≤5 J/g, preferably ≤3 J/g, particularly preferably ≤1 J/g.

In a preferred embodiment of the present invention, amorphous polyurethane-polyurea polymers are mixed with crystallizing polyurethane-polyurea polymers. In these preferred mixtures, the proportion of crystallizing polyurethane-polyurea polymer is preferably ≥5% by weight, particularly preferably ≥20% by weight, very particularly preferably ≥40% by weight, in each case based on the total mixture.

The aqueous polyurethane-polyurea dispersion employed according to the invention preferably has a solids content of from 20% to 60% by weight, preferably from 25% to 55% by weight, and particularly preferably from 30% to 50% by weight.

The aqueous dispersion comprising the above-described polyurethane-polyurea polymers and polymer mixtures of the invention that is employed according to the invention can generally be prepared by any method known to those skilled in the art. It is preferably prepared by the acetone process. In this process, prepolymers are preferably prepared from components (a) to (c), dissolved in acetone, and subjected to chain extension with component (d). After dispersing with water, the acetone is preferably distilled off. The use and performance of the acetone process is prior art and is known to those skilled in the art.

It is according to the invention preferable that the aqueous polyurethane-polyurea dispersion contains no external emulsifiers.

In a further preferred embodiment, the aqueous dispersion of the invention comprising at least one polyurethane-polyurea polymer may comprise further constituents.

These are for example selected from the group consisting of oxidation stabilizers, hydrolysis stabilizers, organic and inorganic fillers, plasticizers, other dispersions containing polymers such as PVC (polyvinyl chloride), PVA (polyvinyl acetate), EVA (polyethylene vinyl acetate), PAC (polyacrylate), CR (polychloroprene), PS (polystyrene), SBR (polystyrene butadiene), NBR (polyacrylonitrile), and mixtures thereof, tackifiers, pigments, polysiloxane dispersions, isocyanates, blocked isocyanates, and mixtures thereof, in order for example to tailor the properties of the dispersion to requirements.

The proportion of further constituents optionally present is preferably not more than 70% by weight and not less than 0.01% by weight, particularly preferably not more than 50% by weight, very particularly preferably not more than 30% by weight, in each case based on the solids content of the overall formulation.

The solids content of the aqueous dispersion comprising at least one polyurethane-polyurea polymer is according to the invention from 20% to 70% by weight, preferably from 25% to 60% by weight, particularly preferably from 30% to 55% by weight.

When used according to the invention, the aqueous dispersion of the invention can generally be applied to at least one substrate present by any method known to those skilled in the art.

The aqueous dispersion of the invention is preferably supplied by means of a spray gun, preferably by means of an airless spray gun or air-atomizing spray gun known to those skilled in the art. Preference is given to spraying with atomizing air at a pressure of 0.1 to 5 bar(a) pressure. However, it is in accordance with the invention also possible for the dispersion to be supplied "airlessly", as described for example in WO 2015/137808.

The aqueous dispersion is according to the present invention preferably applied in an amount (wet) of 20 to 180 g/m², particularly preferably 30 to 160 g/m², very particularly preferably 40 to 140 g/m², especially preferably 45 to 120 g/m².

The aqueous dispersion is according to the present invention preferably applied in an amount (solid) of 10 to 90 g/m², particularly preferably 15 to 80 g/m², very particularly preferably 20 to 60 g/m².

The amount applied to the foam substrate is according to the invention ≤150 g/m² (wet), preferably ≤100 g/m² (wet), particularly preferably ≤75 g/m² (wet), and very particularly preferably ≤50 g/m² (wet).

The viscosity of the aqueous dispersion employed according to the invention is generally ≤1000 mPa*s, preferably ≤500 mPa*s, particularly preferably ≤200 mPa*s, very particularly preferably ≤100 mPa*s, especially preferably ≤50 mPa*s. The viscosity of the aqueous dispersion employed according to the invention is preferably at least 10 mPa*s. The cited viscosities are in each case measured in accordance with DIN 53019 at 23° C. with spindle L2 at 30 revolutions/minute.

The combination according to the invention of low amount applied (wet), high surface tension of the aqueous dispersion, and low viscosity permits application of the aqueous dispersion in particular to discontinuous surface structures, preferably in the form of droplets and areas that further preferably do not run into a continuous film on the surface of the substrate.

Preference is according to the invention given to the use of aqueous dispersions having high surface tension of preferably ≥30 mN/m, particularly preferably ≥35 mN/m, very particularly ≥40 mN/m. The surface tension is measured in accordance with DIN 53593. In film-forming paints and adhesives, auxiliaries that significantly reduce the surface tension are typically added in order to achieve better film-forming properties, thereby favoring—particularly in the case of porous bodies and aqueous dispersions of low viscosity—wetting of the inner surfaces of the bodies as a result of capillary effects and surface effects, which is undesirable in the use according to the invention.

After application and drying as a solid on the surface, the at least one polyurethane-polyurea polymer is according to the invention preferably present to an extent of ≥30% by weight, particularly preferably ≥50% by weight, very particularly preferably ≥70% by weight, in each case based on the weight of solid.

This means according to the invention in particular that—in each case based on the weight of solid—≥30% by weight, preferably ≥50% by weight, particularly preferably ≥70% by weight, of the at least one polyurethane-polyurea polymer is present on the substrate surface to a maximum penetration depth of not more than 1 mm, preferably not more than 0.5 mm, particularly preferably not more than 0.2 mm. This preferred feature according to the invention makes it possible to achieve a particularly efficient adhesive yield and also a soft and thin bond seam compared to the prior art, even though a high-modulus, crystalline polyurethane-polyurea polymer is serving as the adhesive.

It is according to the invention preferable when application by means of airless application or air-atomizing application is effected in such a way that the surface tension of the aqueous dispersion to be atomized is sufficiently high that islands or droplets, but not a uniform film, form on the substrates.

In a particular embodiment of the present invention, the aqueous dispersion employed according to the invention may be printed on, for example by means of a digital printing method such as piezo printing, bubble jet printing or valve-jet printing. With this embodiment it is according to the invention possible, preferably also without loss of material through overspray, to apply optimized adhesive patterns that are optimally tailored to the particular connection problem, for example in respect of location, material, and layer thickness of the aqueous dispersion.

It is according to the invention preferable for two substrates to be bonded to one another. In one embodiment of the present invention, just one of the at least two substrates to be bonded to one another is loaded with the aqueous dispersion and treated accordingly before the adhesive layer thus formed is brought into contact with a further substrate.

In a further preferred embodiment of the invention, the aqueous dispersion comprising at least one polyurethane-polyurea polymer is applied to at least two, preferably two, of the at least two, preferably two, i.e. both, substrates, in particular substrate surfaces, to be bonded.

It is according to the invention possible, as required in the individual case, for different substrate surfaces to be coated with different aqueous dispersions comprising at least one polyurethane-polyurea polymer, i.e. formed from different components mentioned above.

Contrary to the methods from the prior art, the contacting of the substrate surfaces coated with the adhesive layer with the surfaces to be bonded preferably takes place after the sprayed-on or printed-on aqueous dispersions have dried almost completely. The water content of the adhesive layer is therefore preferably less than 20% by weight, preferably less than 10% by weight, particularly preferably less than 8% by weight, very particularly preferably less than 5% by weight, especially preferably less than 3% by weight. The water content of the adhesive layer is determined as the residual water content in percent by weight as the difference between the application of aqueous dispersion and the dry weight after drying at 40° C. in a convection oven after 24 h.

The drying of the aqueous dispersion to obtain the adhesive layer preferably takes place at room temperature but, depending on the use, can also take place by drying with hot air or, for example, IR radiation.

The bonding of substrates is according to the invention effected by contacting the substrates at temperatures below the melting temperature of the at least one polyurethane-polyurea polymer employed according to the invention, i.e. at a temperature of less than 40° C., preferably less than 35° C., particularly preferably less than 30° C., and very particularly preferably less than 25° C.

The surfaces to be bonded are according to the invention brought into contact for at least 5 sec, preferably at least 30 sec, and very particularly preferably at least 2 min, after the aqueous dispersion on the substrate has been heated to one of the temperatures mentioned above, preferably for a time of at least 1 sec.

The bonding of substrates is according to the invention effected by contacting the substrates at a pressure of 0.1 to 5 bar(a), preferably 0.2 to 3 bar(a), particularly preferably 0.25 to 2 bar(a), particularly preferably 0.3 to 1.5 bar(a).

The substrates coated with the adhesive layer are according to the invention brought into contact generally within a period of 5 sec to 120 min, preferably 30 sec to 60 min, particularly preferably 2 min to 30 min.

All substrates known to those skilled in the art can according to the invention generally be bonded to like or different substrates. Preference is according to the invention given to employing at least one substrate that is a foam substrate or a porous material, preferably having a bulk density of less than 200 g/l, particularly preferably less than 120 g/l, very particularly preferably less than 80 g/l.

A foam substrate is understood as meaning a substrate made of foam, foams generally being synthetically produced substances having a cellular structure and low density. Foams employable according to the invention may be open-cell, closed-cell or mixed-cell, preferably open-cell or mixed-cell. Depending on their hardness, foams are divided into rigid and flexible foams. Virtually all plastics are suitable for foaming.

In a preferred embodiment of the present invention, the foam substrate(s) comprise, preferably consist of, polyurethane and/or a rubber such as natural rubber (NR), styrene-butadiene rubber (SBR), ethylene-propylene-diene polymer (EPDM), butadiene-acrylonitrile rubber (NBR) or chloroprene rubber (CR).

In a particularly preferred embodiment of the invention, the foam substrate(s) consist of polyurethane.

It is according to the invention possible for a foam or a porous material to be bonded to a further foam or porous material, wherein both foams or porous materials may be the same or different. It is according to the invention also possible for a foam or a porous material to be bonded to a non-porous material, for example one selected from the group consisting of wood, paper, leather, textiles, cork, plastics, in particular thermoplastics, elastomers, duromers, composites, for example polyvinyl chloride, polyurethanes, polyvinyl acetate, ABS, rubbers, polyethylene vinyl acetate, polycarbonate or polyolefins, for example filled or unfilled polypropylene, and combinations thereof.

In a preferred embodiment, the at least one polyurethane-polyurea polymer present in the aqueous dispersion employed according to the invention does not, in contrast to the prior art, form on the surface of a foam or porous material, on contact, a continuous film that is immediately tacky when wet or that is bonded in the wet state by compressing and subsequent drying.

Since bonding according to the invention preferably takes place only after the aqueous dispersion has dried on the substrate, and since activation, in particular by heating, can take place at any time and also separately from the drying process, no pot life needs to be taken into account. The advantage of this property according to the invention is that the place of application of the aqueous dispersion can be separate from the place of activation and/or from the place of production of the bond.

In a preferred embodiment according to the invention, only one of two coated substrates needs to be heat-activated. Bonding is then effected by bringing the one heat-activated substrate into contact with the other substrate coated according to the invention, but not heat-activated.

Another advantage of the present invention is that dry adhesive layers may be bonded to other substrates. Particularly in the area of foam bonding and especially in the production of furniture, mattresses and the like, the residual moisture or residual solvent content is a major problem in bonding with aqueous or solvent-based adhesives that can be avoided by the present invention, particularly when the manufactured products are shrink-wrapped in a packaging immediately after bonding.

The bonds obtained according to the invention exhibit sufficient immediate strengths, particularly up to the point of instantaneous tearing of the material.

The open time of the aqueous dispersions employed according to the invention is preferably at least 2 minutes, particularly preferably at least 4 minutes, very particularly preferably at least 6 min, especially preferably at least 8 min.

In particular when bonding foam on foam or foam on other substrate surfaces, for example wood, metal or plastic, that have a three-dimensional structure and thus are not flat, the bonds produced according to the invention are capable of absorbing the restoring forces of the foam without a wait time after heat activation, in particular without complete removal of the water.

The substrates to be bonded, in particular nonpolar substrates, may according to the invention be subjected to a pretreatment of the substrate surface known to those skilled in the art, for example by priming, flaming or corona treatment, before the aqueous dispersion is applied.

The present invention can particularly preferably be used for bonding foam to foam, foam to wood, foam to various plastics, or textiles to various other substrates.

The present invention also relates to a method for connecting at least two substrates, comprising at least the steps of (A) providing an aqueous dispersion comprising at least one polyurethane-polyurea polymer that after drying has a glass transition temperature Tg of −65 to 10° C. and a melting temperature of 40 to 80° C., formed from
  (a) at least one difunctional polyester polyol having a molecular weight of 400 to 5000 g/mol,
  (b) at least one difunctional polyol component having a molecular weight of 62 to 399 g/mol,
  (c) at least one diisocyanate, and
  (d) at least one chain extender containing at least one ionic group,
(B) applying the aqueous dispersion from step (A) to at least one of the substrates,
(C) drying the at least one dispersion present from step (B) so as to obtain at least one adhesive layer, and
(D) bringing the at least one adhesive layer into contact with a further substrate or with an adhesive layer present on a further substrate at a pressure of 0.1 to 5 bar(a) and a temperature of less than 40° C.

What has been said with regard to the use according to the invention concerning preferred embodiments and details applies accordingly to the method according to the invention.

In particular, it is possible with the use according to the invention and with the method according to the invention to obtain adhesive composites. According to the invention, an adhesive composite comprises a substrate, the adhesive layer obtained according to the invention, and a further substrate. The two substrates may consist of the same or different materials. The substrates may by definition also be textile fabrics. At least one substrate is preferably a foam substrate.

The present invention therefore also relates to an adhesive composite comprising at least two substrates and an adhesive layer obtained according to the invention.

What has been said with regard to the use according to the invention and the method according to the invention concerning preferred embodiments and details applies accordingly to the adhesive composite according to the invention.

Examples

The invention is elucidated in more detail hereinbelow with reference to the examples. The following methods and test methods were employed here:

A) Spray-Application Method:

The adhesive dispersions were applied with a standard spray gun. The adhesive dispersion was supplied to a spray gun and applied to the substrates via a spray jet. After application to the substrate, the adhesive was dried in an oven at 60° C. for 20 min and then compressed after specified times as described in B). The amount of adhesive applied was varied according to requirements; the substrate was weighed on a precision balance without adhesive, immediately after application of the adhesive, and after drying in a hot-air oven, and the wet and dry amounts applied were thereby determined, the reported values being calculated for one square meter.

The exact settings of the spray gun are known in principle to those skilled in the art and can without undue effort be tailored to the specific case and determined by simple preliminary experiments. Examples include:
Adhesive component: Supply pressure 1.3 bar(a)
Atomizer air pressure: 2.8 bar(a)
Bore diameter (nozzle) for the adhesive component: 1.0 mm
Applied weights: 50 to 200 g/m² (wet)

B) Determination of the Initial Strength:

The test material used was ST 5540 PU foam bodies from STN Schaumstoff-Technik-Nürnberg GmbH having the dimensions 10 cm×5 cm×3 cm and a density of 40 kg/m³.

For the assessment of the initial strength, the test specimens were immediately after drying in the drying oven at 60° C. folded in the middle with a wooden rod and immediately passed through 2 steel rollers spaced 10 mm apart (see FIG. 1).

The reference numerals in FIG. 1 are defined as follows:
1 Foam body
2 Upper side of foam bodies
3 Wooden rod
4 Middle
5 Test apparatus
6 Steel rollers
7 Tangential spacing
8 Threaded spindle
9 Bond seam The initial strength was sufficient if the test specimen did not open up despite the restoring forces that develop. The results were classified according to the following classification: Initial strength: good+/slightly open 0/fully open −.

C) Determination of Open Time:

The test material used was ST 5540 PU foam bodies from STN Schaumstoff-Technik-Nürnberg GmbH having the dimensions 10 cm×5 cm×3 cm and a density of 40 kg/m³. For the assessment of the open time, the test specimens were folded in the middle and joined together with light palm pressure immediately, every 60 seconds, or, if required, at defined time intervals after the test specimens had been removed from the hot-air oven. The beginning and the end of the open time were indicated by the strength no longer being sufficient and the test specimen opening up as a result of the restoring forces that develop. The results were classified according to the following classification: Time in minutes: <1 min—poor, ≥4 min—satisfactory, ≥8 min—good D) Determination of Bond Seam Hardness:

After storage for 24 h at room temperature, the bond seam of the test specimens produced under B) underwent sensory evaluation by touch in a direct comparison with reference samples. The reference samples were produced using commercially available polychloroprene latices (Covestro Deutschland AG) of varying Shore A hardness. The bond seam of the test specimen obtained from Dispercoll® C 84 (Shore A hardness of the pure, dried polymer=88) served as reference for a hard bond seam, the bond seam of the test specimen obtained from Dispercoll® C 74 (Shore A hardness of the pure, dried polymer=55) served as reference for a bond seam of intermediate hardness, and the bond seam of the test specimen obtained from Dispercoll® C 2372 (Shore A hardness of the pure, dried polymer=40) served as reference for a soft bond seam. The Dispercoll® C products were in each case applied at 200 g/m² wet weight, corresponding to approx. 110 g/m² dry weight. The results were classified according to the following classification: soft+/medium hard 0/hard −.

E) Determination of Glass Transition Temperatures, Melting Temperatures, and Enthalpies of Fusion by DSC:

The measurement principle of DSC (differential scanning calorimetry) is based on heating the sample and an inert reference in the measurement cell of the calorimeter such that both have the same constant temperature. The sample and reference are heated by means of the same regulated temperature/time program. The temperatures of the sample and reference are measured, compared, and temperature differences arising through physical or chemical changes in the sample morphology are compensated. The applied electrical compensation power is measured and converted into the measure for the caloric heat flow. Such morphological changes are the result of physical changes (glass transition, melting, evaporation) and chemical changes (oxidation, crosslinking). Melting processes, evaporation, and solid-solid transformations (glass transition) are endothermic in nature, whereas crystallization, oxidation and some chemical reactions such as crosslinking are exothermic. The glass transition temperatures, melting temperatures, and enthalpies of fusion were determined by differential scanning calorimetry (DSC) using a Pyris Diamond DSC calorimeter from Perkin-Elmer. For this purpose, a film was produced by knife coating the respective dispersion onto a glass plate at a wet-film thickness of 100 μm and this was dried in a dry box for 3 days at room temperature and 0% room humidity. The DSC curve was then recorded using 10 mg of sample material with the following measurement conditions: Rapid cooling to the starting temperature −100° C., then start of three heatings from −100° C. to +150° C. at a heating rate of 20 K/min and a cooling rate of 320 K/min under a helium atmosphere and cooling with liquid nitrogen. The glass transition temperature corresponds to the temperature at half height of the glass transition, wherein the third heating was assessed. For determination of the melting temperatures and enthalpies of fusion, the first heating was assessed.

F) Starting Materials:

A: Dispercoll® U56, crystallizing polyurethane adhesive dispersion, glass transition temperature Tg −50° C., melting temperature Tm 49° C., obtained from Covestro Deutschland GmbH and used as received.

B: Dispercoll® U54, crystallizing polyurethane adhesive dispersion, glass transition temperature −51° C., melting temperature 49° C., obtained from Covestro Deutschland GmbH and used as received.

C: Dispercoll® U2682, crystallizing polyurethane adhesive dispersion, glass transition temperature Tg −48° C., melting temperature 50° C., obtained from Covestro Deutschland GmbH and used as received.

D: Dispercoll® U42, amorphous polyurethane adhesive dispersion, glass transition temperature −5.1° C., obtained from Covestro Deutschland GmbH and used as received.

E: Dispercoll® U2643, amorphous polyurethane adhesive dispersion, glass transition temperature −51° C., obtained from Covestro Deutschland GmbH and used as received.

TABLE 1

Results for the examples according to the invention and for the comparative examples

| No. | Dispersion used | Amount applied wet/solid [g/m²] | Initial strength | Hardness of seam | Open time [min] | Water content of adhesive after drying [% by weight] |
|---|---|---|---|---|---|---|
| V1 | A | 200/98 | + | − | 8 | <10 |
| 2 | A | 108/51 | + | 0 | 8 | <10 |
| 3 | A | 60/27 | + | + | 8 | <10 |
| V4 | B | 200/95 | + | − | 8 | <10 |
| 5 | B | 100/50 | + | 0 | 4 | <10 |
| V7 | C | 210/100 | 0 | − | 8 | <10 |
| 8 | C | 110/50 | 0 | 0 | 8 | <10 |
| 9 | C | 50/24 | 0 | + | 8 | <10 |
| V10 | D | 200/98 | − | + | 0 | <10 |
| V11 | D | 100/52 | − | + | 0 | <10 |
| V12 | D | 50/26 | − | + | 0 | <10 |
| V13 | E | 210/90 | − | 0 | 0 | <10 |
| V14 | E | 100/39 | − | + | 0 | <10 |
| V15 | E | 50/21 | − | + | 0 | <10 |

V Comparative example

The invention claimed is:

1. A method for connecting at least two substrates, comprising:
   (A) providing an aqueous dispersion comprising at least one polyurethane-polyurea polymer that after drying has a glass transition temperature Tg of −65 to 10° C. and a melting temperature of 40 to 80° C., formed from
      (a) at least one difunctional polyester polyol having a number-average molecular weight of 400 to 5000 g/mol,
      (b) at least one difunctional polyol component having a number-average molecular weight of 62 to 399 g/mol,
      (c) at least one diisocyanate, and
      (d) at least one chain extender, optionally containing at least one ionic group,
   (B) applying the aqueous dispersion from step (A) to at least one of the substrates,
   (C) drying the at least one dispersion present from step (B) so as to obtain at least one adhesive layer, and
   (D) bringing the at least one adhesive layer into contact with a further substrate or with an adhesive layer present on a further substrate at a pressure of 0.2 to 3 bar (a) and a temperature of less than 40° C.;
   wherein the polyurethane-polyurea polymer after drying has an enthalpy of fusion ≥ 5 J/g, as measured by DSC in accordance with DIN 65467 at a heating rate of 20 K/min.

2. The method as claimed in claim 1, wherein component (a) comprises difunctional aliphatic polyester polyols based on succinic acid, methylsuccinic acid, glutaric acid, adipic acid, maleic acid, or a combination thereof and propane-1,3-diol, butane-1,4-diol, hexane-1,6-diol, or a combination thereof.

3. The method as claimed in claim 1, wherein component (a) comprises difunctional aromatic polyester polyols (a) based on o-phthalic acid and/or o-phthalic anhydride and butane-1,4-diol and/or hexane-1,6-diol.

4. The method as claimed in claim 1, wherein component (c) comprises tetramethylene diisocyanate, methylpentamethylene diisocyanate, hexamethylene diisocyanate, dodecamethylene diisocyanate, 1,4-diisocyanatocyclohexane, 1-isocyanato-3,3,5-trimethyl-5-isocyanatomethylcyclohexane, 4,4'-diisocyanatodicyclohexylmethane, 4,4'-diisocyanato-2,2-dicyclohexylpropane, 4,4'-diisocyanatodicyclohexylmethane (H12MDI), tolylene 2,4-diisocyanate and/or tolylene 2,6-diisocyanate (TDI), diphenylmethane 2,2'-diisocyanate, diphenylmethane 2,4'-diisocyanate and/or diphenylmethane 4,4'-diisocyanate (MDI), or mixtures thereof.

5. The method as claimed in claim 1, wherein the aqueous polyurethane-polyurea dispersion has a solids content of from 20% to 60% by weight.

6. The method as claimed in claim 1, wherein—in each case based on the weight of solid—≥30% by weight of the at least one polyurethane-polyurea polymer is present on the substrate surface to a maximum penetration depth of not more than 1 mm.

7. The method as claimed in claim 1, wherein the aqueous dispersion is applied in an amount (wet) of 20 to 180 g/m$^2$.

8. The method as claimed in claim 1, wherein the aqueous dispersion is applied in an amount (solid) of 10 to 90 g/m$^2$.

9. The method as claimed in claim 1, wherein at least one substrate is a foam substrate or a porous material.

10. The method as claimed in claim 1, wherein component (d) comprises amine chain extenders having at least one ionic group.

11. An adhesive composite comprising at least two substrates and an adhesive layer present between in each case two substrates, obtained by the method as claimed in claim 1.

12. The method of claim 9, wherein the foam substrate or the porous material has a bulk density of less than 200 g/l.

13. The method of claim 10, wherein component (d) comprises a diamino compound additionally bearing a sulfonate and/or a carboxylate group.

14. The method of claim 10, wherein component (d) comprises a sodium or potassium salt of N-(2-aminoethyl)-2-aminoethanesulfonic acid, of N-(3-aminopropyl)-2-aminoethanesulfonic acid, of N-(3-aminopropyl)-3-aminopropanesulfonic acid, of N-(2-aminoethyl)-3-aminopropanesulfonic acid, of an analogous carboxylic acid, or mixtures thereof.

15. The method of claim 9, wherein the substrate is a polyurethane foam substrate.

16. The method of claim 1, wherein the pressure in step (D) is 0.25 to 2 bar (a).

17. The method of claim 1, wherein the pressure in step (D) is 0.3 to 1.5 bar (a).

18. The method of claim 1, wherein the polyurethane-polyurea polymer after drying has an enthalpy of fusion ≥10 J/g, as measured by DSC in accordance with DIN 65467 at a heating rate of 20 K/min.

19. The method of claim 1, wherein the polyurethane-polyurea polymer after drying has an enthalpy of fusion ≥20 J/g, as measured by DSC in accordance with DIN 65467 at a heating rate of 20 K/min.

20. The method of claim 1, wherein the polyurethane-polyurea polymer after drying has an enthalpy of fusion ≥40 J/g, as measured by DSC in accordance with DIN 65467 at a heating rate of 20 K/min.

\* \* \* \* \*